(12) United States Patent
Lillie et al.

(10) Patent No.: US 10,102,411 B2
(45) Date of Patent: Oct. 16, 2018

(54) HYBRID OPTICAL AND CAPACITIVE SENSOR

(71) Applicant: Synaptics Incorporated, San Jose, CA (US)

(72) Inventors: Jeffrey S. Lillie, Rochester, NY (US); Mark Pude, Rochester, NY (US); Eric Bohannon, Rochester, NY (US); Eric Moule, Rochester, NY (US); Erik Jonathon Thompson, Phoenix, AZ (US); Patrick Smith, San Jose, CA (US); Lynn Kern, Phoenix, AZ (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 15/415,507

(22) Filed: Jan. 25, 2017

(65) Prior Publication Data

US 2018/0211078 A1 Jul. 26, 2018

(51) Int. Cl.
*G06K 9/00* (2006.01)
*G06F 3/044* (2006.01)

(52) U.S. Cl.
CPC ......... *G06K 9/0002* (2013.01); *G06K 9/0004* (2013.01); *G06F 3/044* (2013.01)

(58) Field of Classification Search
CPC .......................... G06K 9/0002; G06K 9/0004
See application file for complete search history.

(56) References Cited

U.S. PATENT DOCUMENTS

| 5,726,443 | A | 3/1998 | Immega et al. |
| 6,501,284 | B1 * | 12/2002 | Gozzini ............... G06K 9/0002 324/662 |
| 7,831,070 | B1 | 11/2010 | Cheng et al. |
| 8,311,514 | B2 | 11/2012 | Bandyopadhyay et al. |
| 9,405,415 | B2 | 8/2016 | Morein et al. |
| 2004/0252867 | A1 | 12/2004 | Lan et al. |
| 2008/0166028 | A1 | 7/2008 | Turek et al. |
| 2009/0166411 | A1 | 7/2009 | Kramer et al. |
| 2009/0169071 | A1 | 7/2009 | Bond et al. |
| 2010/0176823 | A1 | 7/2010 | Thompson et al. |
| 2012/0071149 | A1 | 3/2012 | Bandyopadhyay et al. |
| 2012/0303476 | A1 * | 11/2012 | Krzyzanowski .......... G06F 8/60 705/26.5 |
| 2012/0320385 | A1 | 12/2012 | Mu et al. |
| 2014/0267659 | A1 | 9/2014 | Lyon et al. |

(Continued)

OTHER PUBLICATIONS

International Search Report, PCT Application No. US2018/015237, dated Apr. 26, 2018.

*Primary Examiner* — David F Dunphy
(74) *Attorney, Agent, or Firm* — Leydig, Voit & Mayer, Ltd.

(57) ABSTRACT

A hybrid capacitive and optical fingerprint sensor system includes: capacitive sensor electrodes; an optical image sensor having a plurality of image sensor pixels; light conditioning elements, configured to condition light from a sensing region of the hybrid capacitive and optical fingerprint sensor for detection by the optical image sensor; and a processing system having one or more controllers, configured to operate the capacitive sensor electrodes in a low-power mode of operation for the hybrid capacitive and optical fingerprint sensor, and to operate the optical image sensor to acquire an image from the sensing region of the hybrid capacitive and optical fingerprint sensor.

32 Claims, 13 Drawing Sheets

(56) References Cited

U.S. PATENT DOCUMENTS

| | | |
|---|---|---|
| 2015/0015537 A1 | 1/2015 | Riedijk et al. |
| 2016/0092717 A1 | 3/2016 | Ling |
| 2016/0132712 A1 | 5/2016 | Yang et al. |
| 2016/0246396 A1 | 8/2016 | Dickinson et al. |
| 2016/0247010 A1 | 8/2016 | Huang et al. |
| 2018/0046281 A1* | 2/2018 | Pi .......................... G06F 3/044 |

* cited by examiner

HYBRID OPTICAL AND CAPACITIVE SENSOR

BACKGROUND

Input devices, including touch sensor devices (also commonly called touchpads or proximity sensor devices), as well as fingerprint sensor devices, are widely used in a variety of electronic systems.

Touch sensor devices typically include a sensing region, often demarked by a surface, in which the touch sensor device determines the presence, location and/or motion of one or more input objects, typically for purposes allowing a user to provide user input to interact with the electronic system.

Fingerprint sensor devices also typically include a sensing region in which the fingerprint sensor device determines presence, location, motion, and/or features of a fingerprint or partial fingerprint, typically for purposes relating to user authentication or identification of a user.

Touch sensor devices and fingerprint sensor devices may thus be used to provide interfaces for the electronic system. For example, touch sensor devices and fingerprint sensor devices are often used as input devices for larger computing systems (such as opaque touchpads and fingerprint readers integrated in or peripheral to notebook or desktop computers). Touch sensor devices and fingerprint sensors are also often used in smaller computing systems (such as touch screens integrated in mobile devices such as smartphones and tablets).

SUMMARY

In an exemplary embodiment, a hybrid capacitive and optical fingerprint sensor system includes: capacitive sensor electrodes; an optical image sensor having a plurality of image sensor pixels; light conditioning elements, configured to condition light from a sensing region of the hybrid capacitive and optical fingerprint sensor for detection by the optical image sensor; and a processing system having one or more controllers, configured to operate the capacitive sensor electrodes in a low-power mode of operation for the hybrid capacitive and optical fingerprint sensor, and to operate the optical image sensor to acquire an image from the sensing region of the hybrid capacitive and optical fingerprint sensor.

In another exemplary embodiment, a hybrid capacitive and optical fingerprint sensor includes: capacitive sensor electrodes; an optical image sensor having a plurality of image sensor pixels; and light conditioning elements, configured to condition light from a sensing region of the hybrid capacitive and optical fingerprint sensor for detection by the optical image sensor; wherein: the capacitive sensor electrodes and the light conditioning elements are disposed in a combined conditioning and capacitive sensor layer of the hybrid capacitive and optical fingerprint sensor, and the optical image sensor is disposed in an optical sensor layer of the hybrid capacitive and optical fingerprint sensor; or the capacitive sensor electrodes and the optical image sensor are disposed in a combined optical and capacitive sensor layer of the hybrid capacitive and optical fingerprint sensor, and the light conditioning elements are disposed in a conditioning layer of the hybrid capacitive and optical fingerprint sensor.

In yet another exemplary embodiment, a processing system is provided for a hybrid capacitive and optical fingerprint sensor having capacitive sensor electrodes, light conditioning elements, and an optical image sensor. The processing system includes one or more controllers configured to execute processor-executable instructions to control the capacitive sensor electrodes and the optical image sensor, wherein execution of the processor-executable instructions facilitates: operating the capacitive sensor electrodes in a low-power mode of operation for the hybrid capacitive and optical fingerprint sensor; and operating the optical image sensor to acquire an image from the sensing region of the hybrid capacitive and optical fingerprint sensor.

DETAILED DESCRIPTION

The following detailed description is exemplary in nature and is not intended to limit the disclosure or the application and uses of the disclosure. Furthermore, there is no intention to be bound by any expressed or implied theory presented in the preceding background and brief description of the drawings, or the following detailed description.

Exemplary embodiments provide for a hybrid optical and capacitive sensor configured to be used in different modes of operation that are particularly suitable for different situations. For example, the optical sensor components of the hybrid optical and capacitive sensor may be utilized to provide a relatively high resolution image of features of a biometric input, while capacitive sensor components of the hybrid optical and capacitive sensor may be utilized for relatively low-power modes of operation, such as to provide wake-on-finger (WOF) and navigation (NAV) functions. Hybrid sensors according to exemplary embodiments are thus able to provide different levels of power consumption and sensor performance that are particularly suitable for different usage scenarios, and further are able to provide relatively stronger security and anti-spoof functionality.

Figure 1:
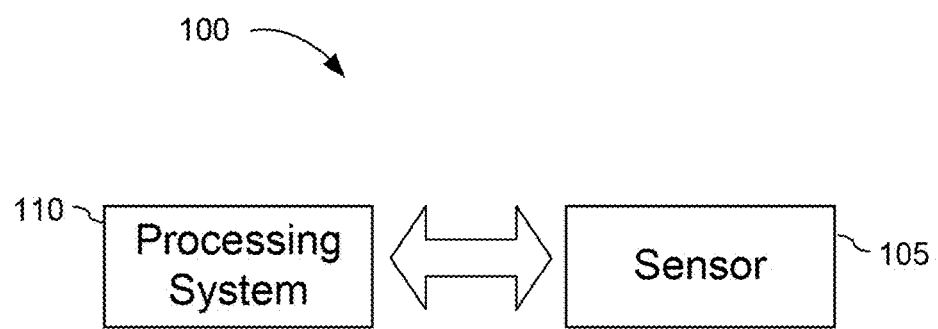
FIG. 1 is a block diagram depicting an exemplary input device.

FIG. 1 is a block diagram depicting an example input device 100. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers (such as smart watches and activity tracker devices). Additional examples of electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system may be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include Inter-Integrated Circuit (I2C), Serial Peripheral Interface (SPI), Personal System/2 (PS/2), Universal Serial Bus (USB), Bluetooth, radio frequency (RF), and Infrared Data Association (IRDA).

In FIG. 1, a sensor 105 is included with the input device 100. The sensor 105 comprises one or more sensing elements configured to sense input provided by one or more input objects in a sensing region. Examples of input objects include fingers, styli, and hands. The sensing region encompasses any space above, around, in and/or near the sensor 105 in which the input device 100 is able to detect user input (e.g., user input provided by one or more input objects). The sizes, shapes, and locations of particular sensing regions may vary from embodiment to embodiment. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The input device 100 comprises one or more sensing elements for detecting user input. Some implementations utilize arrays or other regular or irregular patterns of sensing elements to detect the input object 140. The input device 100 may utilize different combinations of sensor components and sensing technologies to detect user input in the sensing region 120.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects. In another implementation, an absolute capacitance sensing method operates by modulating a drive ring or other conductive element that is ohmically or capacitively coupled to the input object, and by detecting the resulting capacitive coupling between the sensor electrodes and the input object. The reference voltage may by a substantially constant voltage or a varying voltage and in various embodiments; the reference voltage may be system ground.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "drive electrodes") and one or more receiver sensor electrodes (also "receiver electrodes" or "pickup electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may be, for example, a substantially constant voltage or system ground. In some embodiments, transmitter sensor electrodes and receiver sensor electrodes may both be modulated. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In other exemplary implementations, the input device 100 may utilize optical sensing techniques where one or more sensing elements detect light from the sensing region. The detected light may be reflected from the input object, transmitted through the input object, emitted by input object, or some combination thereof. The detected light may be in the visible or invisible spectrum (such as infrared or ultraviolet light). Example optical sensing elements include photodiodes, complementary metal-oxide-semiconductor (CMOS) image sensor arrays, charge-coupled device (CCD) arrays, photodiodes, and other suitable photosensors sensitive to light in wavelength(s) of interest. Active illumination may be used to provide light to the sensing region, and reflections from the sensing region in the illumination wavelength(s) may be detected to determine input information corresponding to the input object.

One exemplary optical technique utilizes direct illumination of the input object, which may or may not be in contact with an input surface of the sensing region depending on the configuration. One or more light sources and/or light guiding structures are used to direct light to the sensing region. When an input object is present, this light is reflected directly from surfaces of the input object, which reflections can be detected by the optical sensing elements and used to determine input information about the input object.

Another exemplary optical technique utilizes indirect illumination based on internal reflection to detect input objects in contact with an input surface of the sensing region. One or more light sources are used to direct light in a transmitting medium at an angle at which it is internally reflected at the input surface of the sensing region, due to different refractive indices at opposing sides of the interface defined by the input surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object, where the light is directed to the input surface at an angle of incidence at which it is totally internally reflected, except at locations where the input object is in contact and causes the light to partially transmit across this interface. An example of this is presence of a finger introduced to an input surface defined by a glass to air interface. The higher refractive index of human skin compared to air causes light incident at the input surface at the critical angle of the interface to air to be partially transmitted through the finger, where it would otherwise be totally internally reflected at the glass to air interface. This optical response can be detected by the system and used to determine spatial information. In some embodiments, this can be used to image small scale surface variations of the input object, such as fingerprint patterns, where the internal reflectivity of the incident light differs depending on whether a ridge or valley of the finger is in contact with that portion of the input surface.

Some implementations of the input device 100 are configured to provide images that span one, two, three, or higher dimensional spaces. The input device 100 may have a sensor resolution that varies from embodiment to embodiment depending on factors such as the particular sensing technology involved and/or the scale of information of interest. In some embodiments, the sensor resolution is determined by the physical arrangement of an array of sensing elements, where smaller sensing elements and/or a smaller pitch can be used to define a higher sensor resolution.

The input device 100 may be implemented as a fingerprint sensor having a sensor resolution high enough to capture discriminative features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 750 pixels per inch (ppi) is capable of reliably capturing these higher level features.

In some embodiments, a fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture to a fingerprint input based on relative movement between the user's finger and the sensing region. Typically, the swipe sensor includes a linear array or a thin two-dimensional array of sensing elements configured to capture multiple frames as the user's finger is swiped over the sensing region. The multiple frames may then be reconstructed to form an image of the fingerprint corresponding to the fingerprint input. In some implementations, the sensor is configured to capture both placement and swipe inputs.

In some embodiments, a fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some exemplary imaging areas for partial placement sensors include an imaging area of 100 $mm^2$ or less. In another exemplary embodiment, a partial placement sensor has an imaging area in the range of 20-50 $mm^2$. In some implementations, the partial fingerprint sensor has an input surface that is the same size the imaging area.

In FIG. 1, a processing system 110 is included with the input device 100. The processing system 110 comprises parts of or all of one or more integrated circuits (ICs) and/or other circuitry components. The processing system 110 is coupled to the sensor 105, and is configured to detect input in the sensing region using sensing hardware of the sensor 105.

The processing system 110 may include driver circuitry configured to drive sensing signals with sensing hardware of the input device 100 and/or receiver circuitry configured to receive resulting signals with the sensing hardware. For example, a processing system for a mutual capacitance sensor device may be configured to drive transmit signals onto transmitter sensor electrodes of the sensor 105, and/or receive resulting signals detected via receiver sensor electrodes of the sensor 105. Further, a processing system for a self capacitance sensor device may be configured to drive absolute capacitance signals onto sensor electrodes of the sensor 105, and/or receive resulting signals detected via those sensor electrodes of the sensor 105. In another example, a processing system for an optical sensor device may be configured to drive one or more light-emitting diodes (LEDs) or other light sources, and/or receive resulting signals via optical receiving elements of the sensor 105.

The processing system 110 may include processor-readable instructions, such as firmware code, software code, and/or the like. The processing system 110 can be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the sensor 105 of the input device 100 to produce electrical signals indicative of input (or lack of input) in a sensing region. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The sensing region of the input device 100 may overlap part or all of an active area of a display device, for example, if the sensor 105 provides a touch screen interface. The display device may be any suitable type of dynamic display capable of displaying a visual interface to a user, including an inorganic LED display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for thin-film transistor (TFT) circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device.

Figure 2A:
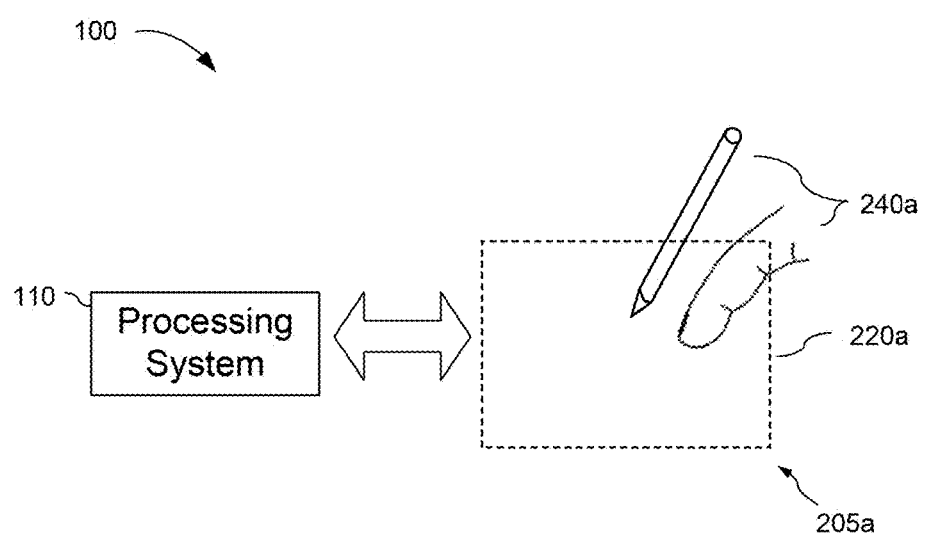
FIGS. 2A-2B are block diagrams depicting further exemplary input devices.
Figure 2B:
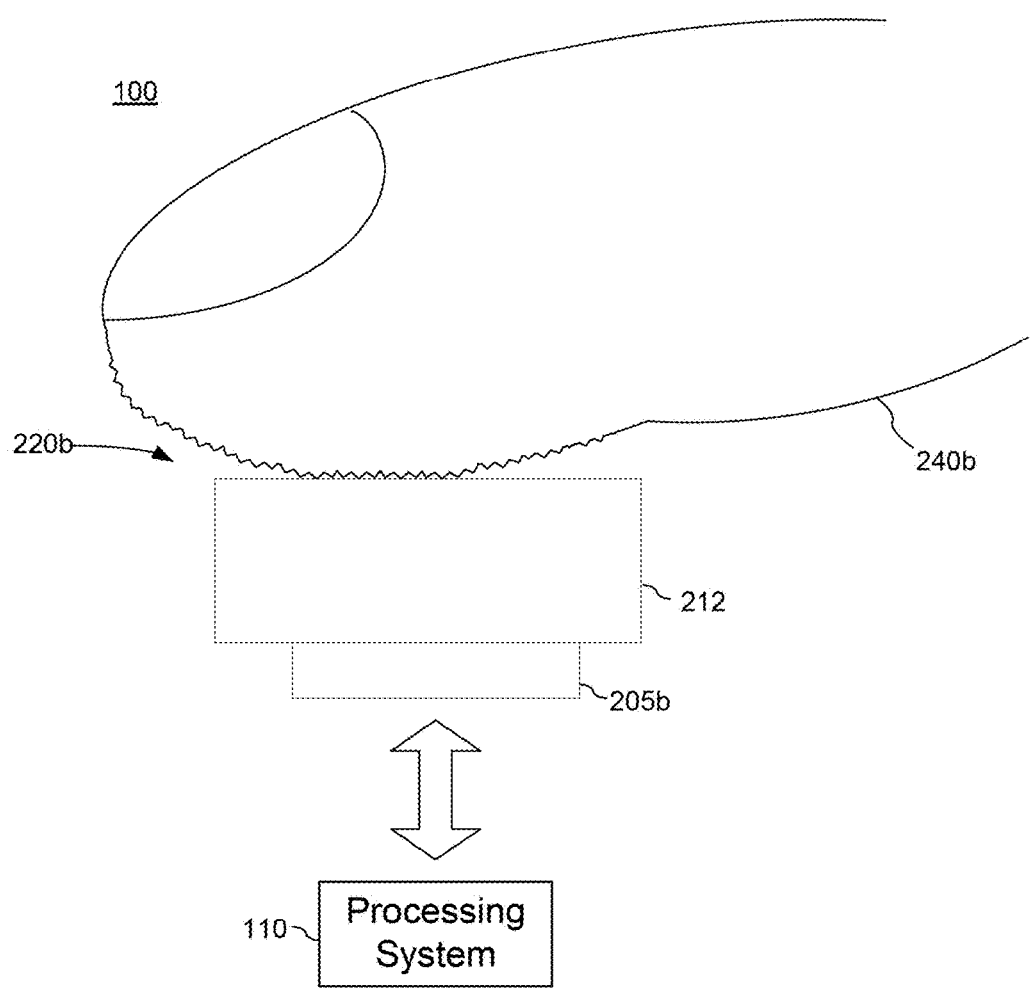

FIGS. 2A-2B are block diagrams depicting further exemplary input devices. In FIG. 2A, the input device 100 is shown as including a touch sensor 205a. The touch sensor 205a is configured to detect position information of an input object 240a within the sensing region 220a. The input object 240a may include a finger or a stylus, as shown in FIG. 2A. The sensing region 220a may include an input surface having a larger area than the input object. The touch sensor 205a may include an array of sensing elements with a resolution configured to detect a location of a touch to the input surface.

In FIG. 2B, the input device 100 is shown as including a fingerprint sensor 205b. The fingerprint sensor 205b is configured to capture a fingerprint from a finger 240b. The fingerprint sensor 205b is disposed underneath a cover layer 212 that provides an input surface for the fingerprint to be placed on or swiped over the fingerprint sensor 205b. The sensing region 220b may include an input surface with an area larger than, smaller than, or similar in size to a full fingerprint. The fingerprint sensor 205b has an array of sensing elements with a resolution configured to detect surface variations of the finger 240b, and the fingerprint sensor 205b has a higher resolution than the touch sensor 205a of FIG. 2A.

The cover layer 212 depicted in FIG. 2B may be, for example, a relatively thick layer of cover glass (e.g., up to 400 μm thick or more). Because it becomes more difficult to perform capacitive fingerprint sensing as the thickness of the cover glass increases, for relatively thick layers of cover glass, it is often advantageous to use an optical fingerprint sensor as the fingerprint sensor 205b. In certain implementations, CMOS image sensors may be advantageous due to the high image quality and high resolution offered by such sensors.

Exemplary embodiments further utilize a capacitive sensor in combination with an optical fingerprint sensor to provide a hybrid optical and capacitive sensor. While the optical sensor components of the hybrid sensor are used to provide the relatively high resolution imaging needed for fingerprint sensing, the capacitive sensor components of the hybrid sensor may provide relatively low-power modes of operation corresponding to other functions, such as WOF, NAV, resolution adjustment, or finger position detection, as well as security and anti-spoof functions. The capacitive sensor components may include a transcapacitive sensor, an absolute capacitance sensor, or a capacitive sensor configured to sense both transcapacitance and absolute capacitance.

In certain exemplary embodiments, the capacitive sensor components of the hybrid sensor may also provide sufficient resolution for fingerprint sensing (e.g., at a resolution lower than the resolution provided by the optical sensor components of the hybrid sensor).

Figure 3A:
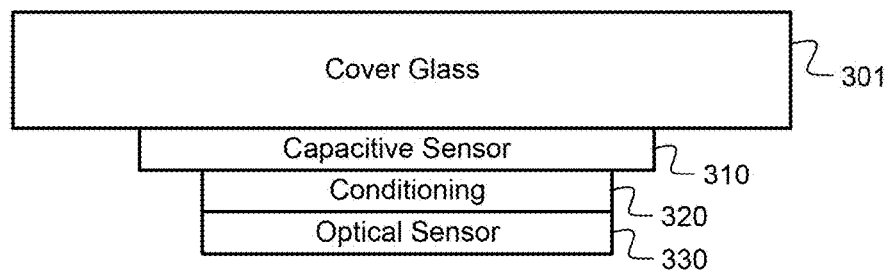
FIGS. 3A-3C are schematic diagrams depicting exemplary hybrid sensors according to exemplary embodiments.
Figure 3B:
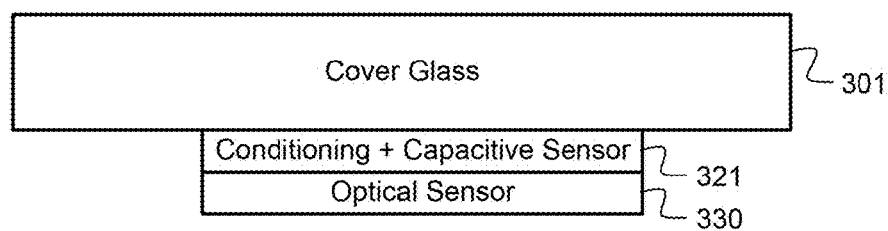
Figure 3C:
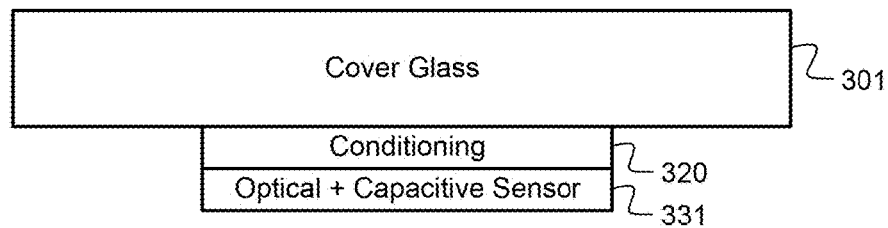

FIGS. 3A-3C are schematic diagrams depicting exemplary hybrid sensors.

FIG. 3A is a schematic diagram of a first exemplary embodiment of a hybrid sensor where a capacitive sensor layer 310 is disposed proximate to cover glass 301, with a conditioning layer 320 and optical sensor layer 330 disposed below the capacitive sensor layer 310.

The capacitive sensor layer 310 may include transcapacitive sensor components or absolute capacitance sensor components, or both. An exemplary approach for providing the capacitive sensor layer 310 includes depositing metal on glass or a polyimide film (e.g., Kapton) or some other transparent substrate utilizing low-cost fabrication techniques to provide capacitive sensor electrodes.

The conditioning layer 320 may include a light filter or other optical element that acts on light incident on the conditioning layer 320 to facilitate optical sensing by the optical sensor. In certain exemplary embodiments, the light filter may include a collimating element (or elements) which passes a set of light rays falling within an angle of acceptance, but rejects a set of light rays falling outside of the angle of acceptance (examples of collimating elements are described below in connection with FIG. 5A-5B). In other exemplary embodiments, the conditioning layer 320 may include other types of optical elements, such as lenses, mirrors, pinhole cameras, diffractive elements (e.g., Fresnel lenses or zone plates), optical fibers, and the like.

The optical sensor layer 330 may include an image sensor die having a plurality of image sensor pixels, with the pixels being aligned to respective light conditioning elements of the conditioning layer 320 and respective transparent regions or gaps in the capacitive sensor layer 310. It will be appreciated that the capacitive sensor layer 310 may utilize a transparent or opaque conductive material.

The structure depicted in FIG. 3A, which provides the capacitive sensing elements on a substrate in capacitive sensor layer 310 separate from the conditioning layer 320 and the optical sensor layer 330, may be advantageous in situations where the conditioning layer 320 does not utilize metal patterning or does not support electrical contact for the metal patterning, and where incorporating the capacitive sensing elements together with the optical sensing elements in the same layer (e.g., as depicted in FIG. 3C) would result in the surface of the hybrid sensor being too far from the biometric object to be effectively detected by the capacitive sensing elements.

FIG. 3B is a schematic diagram of a second exemplary embodiment of a hybrid sensor with a combined conditioning and capacitive sensor layer 321 disposed below cover glass 301 and optical sensor layer 330 disposed below the combined conditioning and capacitive sensor layer 321. In this exemplary embodiment, light conditioning elements for the optical sensor and capacitive sensor electrodes for the capacitive sensor may be formed on the same substrate. Light conditioning elements of the combined conditioning and capacitive sensor layer 321 may include metal portions that are used as capacitive sensor electrodes, or metal portions separate from the light conditioning elements may be formed on the same substrate as the light conditioning elements. The pixels of the image sensor die of the optical sensor layer 330 are aligned to respective transparent regions or gaps in the combined conditioning and capacitive sensor layer 321, or otherwise positioned in respective optical paths passing through the light conditioning layer.

The structure depicted in FIG. 3B, which provides the capacitive sensing elements in the combined conditioning and capacitive sensor layer 321, provides optimal signal strength for the capacitive sensing elements of the combined conditioning and capacitive sensor layer 321, and is advantageous in situations where the light conditioning elements of the combined conditioning and capacitive sensor layer 321 are able to be formed as a metal array having desired trace pitch and spacing.

FIG. 3C is a schematic diagram of a third exemplary embodiment of a hybrid sensor with a conditioning layer 320 disposed below cover glass 301 and a combined optical and capacitive sensor layer 331 disposed below the conditioning layer 320. In this exemplary embodiment, capacitive sensor electrodes are disposed on the same substrate as the optical sensor, e.g., an image sensor die for an optical sensor, in a manner that does not interfere with the image sensor pixels of the image sensor die. The capacitive sensor electrodes may be positioned within an active sensing area of the optical sensor (e.g., in areas between imaging sensor pixels of the optical sensor), outside of the active sensing area of the optical sensor (e.g., around or adjacent to the image sensor pixels), or both within and outside of the active sensing area of the optical sensor.

The structure depicted in FIG. 3C, which provides the capacitive sensing elements in the combined optical and capacitive sensor layer 331, provides advantages in terms of cost, as it utilizes metal in the image sensor die. It also provides advantages with respect to the manufacturing process, as the alignment of the capacitive sensing elements relative to the optical sensing elements is relatively easy to achieve, and sensor circuitry (such as an analog front end or other signal processing circuits) for both the optical sensor and the capacitive sensor can be formed on the same substrate and connected to the sensing elements without a need for additional external connections.

It will be appreciated that FIGS. 3A-3C are simplified diagrams that show relevant layers of the hybrid sensor, and that not all components of the hybrid sensor are depicted (e.g., specific components of the capacitive sensor and optical sensor or the interconnections between such components or layers). Further, additional components (not depicted) may be provided for processing the input information received through the capacitive sensor and optical sensor.

Figure 4A:
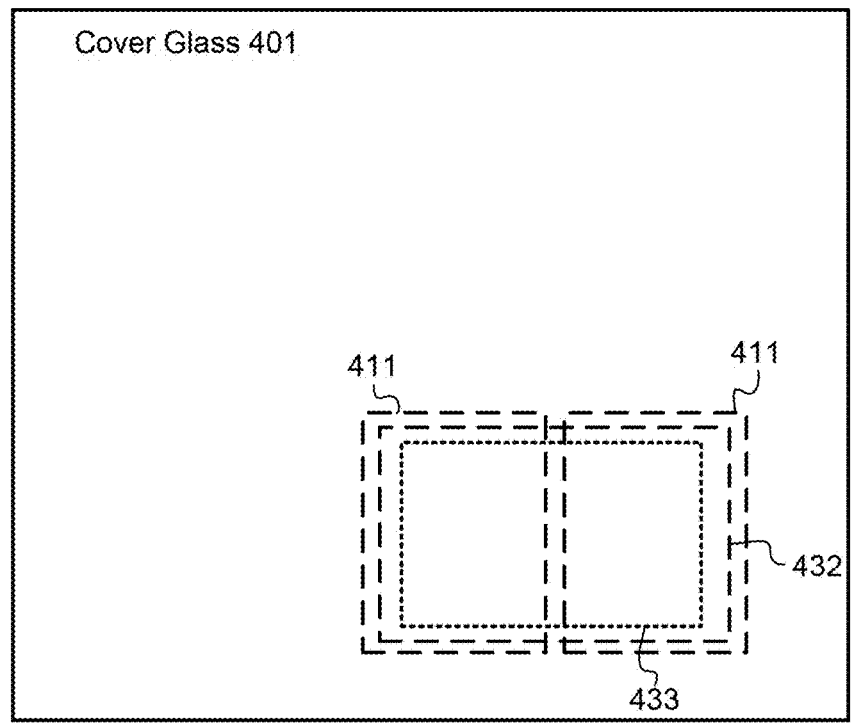
FIGS. 4A-4B are schematic diagrams depicting an exemplary hybrid sensor in accordance with FIG. 3A.
Figure 4B:
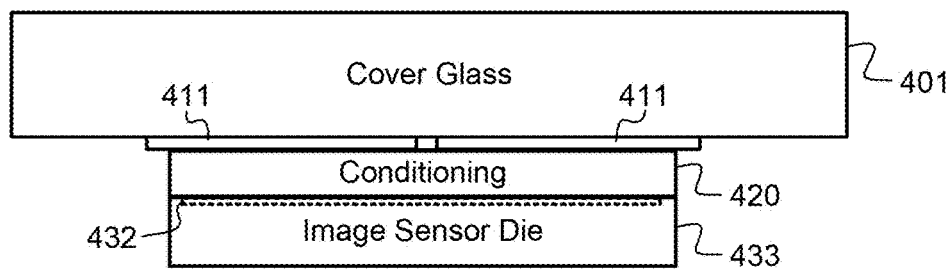

FIGS. 4A-4B are schematic diagrams depicting an exemplary hybrid sensor in accordance with FIG. 3A. FIG. 4A is a top view showing a portion of a cover glass 401 of, for example, a mobile device. Below the cover glass are capacitive electrodes 411, which may be, for example, indium tin oxide (ITO) capacitive touch sensor electrodes. Further below the capacitive electrodes 411 is an image sensor die 432 having an active sensing area 433 comprising a plurality of image sensor pixels. FIG. 4B is a cross-sectional view further illustrating a conditioning layer 420 disposed between the capacitive electrodes 411 and the image sensor die 432.

In FIGS. 4A-4B, by providing a transparent capacitive touch sensor containing one or more touch sensor pixels, a low-power WOF function may be provided for the optical fingerprint sensor such that the optical fingerprint sensor is only activated when a finger is detected by the capacitive touch sensor as being present. This reduces the amount of time the optical fingerprint sensor (and its light source) consumes power since the optical fingerprint sensor is not unnecessarily activated while a finger is not present.

It will be appreciated that a small number of touch sensor pixels may be used to provide the WOF function. In certain exemplary implementations, a low resolution using only two capacitive electrodes 411, as depicted in FIGS. 4A-4B, may be used. In other exemplary implementations, a higher resolution capacitive sensor may be used (e.g., with respect to providing more precise NAV functions or finger position detection, and/or to provide a high enough resolution for fingerprint imaging). NAV functions may include, for example, using the sensing region of the hybrid sensor to detect gestures (such as tapping, double-tapping, scrolling or swiping gestures) and providing corresponding commands with respect to the device and/or feedback to the user via a graphical user interface of the device.

In certain exemplary embodiments, the NAV functions may be relatively low-resolution NAV functions provided based on detecting movement and/or presence of a finger. In other exemplary embodiments, the NAV functions may be relatively higher resolution NAV functions provided based on detecting movement and/or presence of fingerprint features.

Figure 5A:
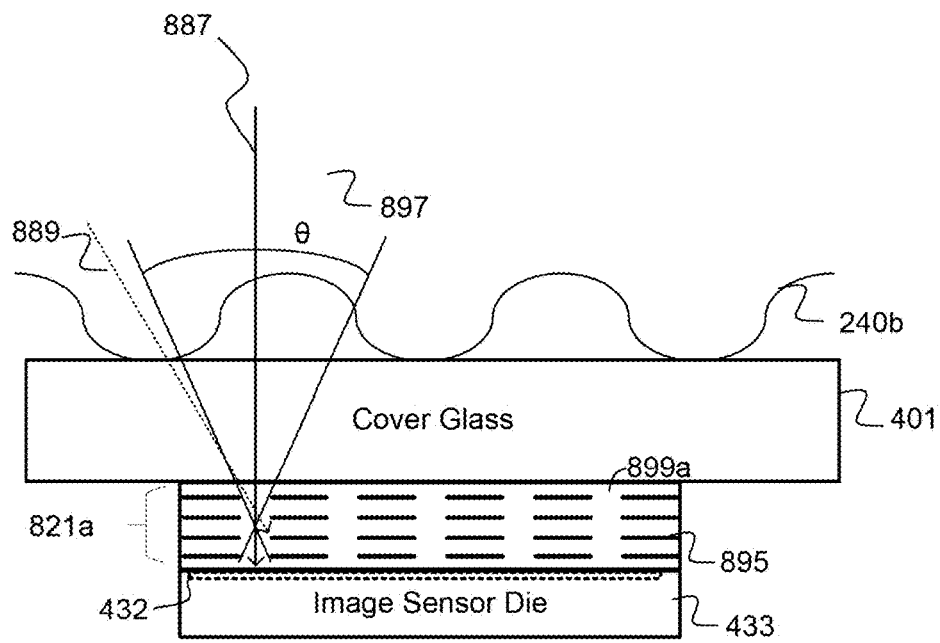
FIGS. 5A-5B are schematic diagrams depicting an exemplary hybrid sensor in accordance with FIG. 3B.
Figure 5B:
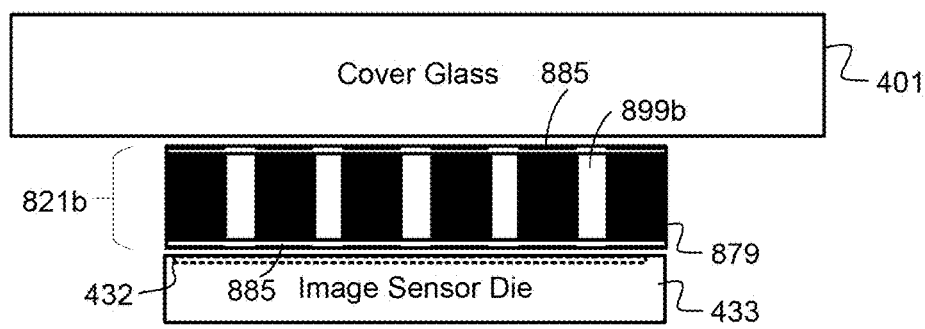

FIGS. 5A-5B are schematic diagrams depicting exemplary hybrid sensors in accordance with FIG. 3B.

In FIG. 5A, a combined conditioning and capacitive sensor layer 821a is provided over an image sensor die 433.

The combined conditioning and capacitive sensor layer 821*a* includes a collimating light filter that rejects a light ray 889 falling outside of an angle of acceptance θ of the light filter, but passes a light ray 887 that falls within the angle of acceptance θ. This allows the image sensor die 433 to capture high resolution image of features, e.g., a features of a fingerprint 240*b*, with reduced blurring. To form the collimating elements, the collimating light filter includes a plurality of intermediate layers having a stacked aperture arrangement. Included are a plurality of opaque layers 895 stacked on top of each other with intervening transparent layers. The opaque layers contain an aperture pattern in which the apertures of the different opaque layers are aligned to collectively form a transparent column region that forms a light collimating column 899*a*, while the opaque layers collectively block light rays falling outside of the acceptance angle. In the combined conditioning and capacitive sensor layer 821*a*, a capacitive sensor electrode pattern may also be formed using the opaque layers 895. For example, one, several, or all of the opaque layers 895 may be formed using an opaque metal. This allows the opaque metal to be used both as light conditioning elements and one or more capacitive sensor electrodes (the opaque metal is both a conductive and light blocking material). The combined conditioning and capacitive sensor layer 821*a* may be built up directly on the image sensor, or provided on a separate substrate that is attached to the image sensor die.

One exemplary approach for creating the combined conditioning and capacitive sensor layer 821*a* includes using spin coating techniques to create the stacked opaque layers 895. Metal pads or single- or multi-layer grids may be formed on top of and/or between and/or below the stacked opaque layers 895 for use as the capacitive sensor electrodes.

FIG. 5B depicts another combined conditioning and capacitive sensor layer 821*b*. Light rays and some other details that may be similar to FIG. 5A are omitted for simplicity. FIG. 5B includes a collimating light filter which may provide similar optics to the light filter described in FIG. 5A. However, unlike the example shown in FIG. 5A, the collimating columns 899*b* are formed using solid vertically extending opaque regions 879 instead of a stacked aperture arrangement. The transparent regions are surrounded by the vertically extending opaque regions and may be hollow, e.g., drilled holes, or may include a solid transparent material. Capacitive sensor electrodes 885 are formed on the same substrate, but may be separate from the light conditioning elements or form a portion of the light conditioning elements in this example.

In the example depicted in FIG. 5B, capacitive sensor electrodes 885 are shown on two opposing sides of the substrate (both a top side and a bottom side) for the combined conditioning and capacitive sensor layer 821*b*. In other exemplary implementations, they may be provided on only one side or the other.

Some non-limiting examples of suitable materials for the combined conditioning and capacitive sensor layer include silicon and glass substrates (e.g., as used for interposers), which contain metal patterned thereon.

An exemplary manufacturing approach for creating the combined conditioning and capacitive sensor layer 821*b* utilizes micro-electro-mechanical systems (MEMS) processing of a silicon wafer to create a uniform array of collimating columns 899*b* through the silicon wafer to serve as light collimators. For this approach, metal pads or a segmented grid array may be patterned on top of the silicon collimator wafer to create capacitive sensor electrodes.

With respect to both of the exemplary structures shown in FIGS. 5A-5B, bond pads may further be added along the edges of the respective combined conditioning and capacitive sensor layers to allow electrical connection from the capacitive sensor elements to a corresponding processing system and/or controller for the capacitive sensor.

Figure 6A:
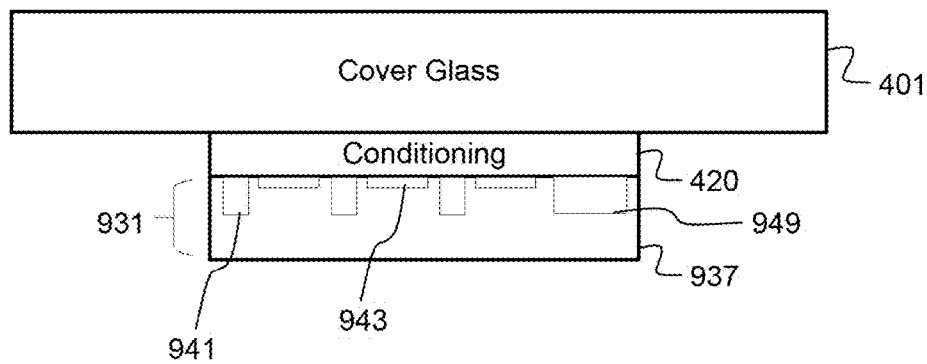
FIGS. 6A-6B are schematic diagrams depicting an exemplary hybrid sensor in accordance with FIG. 3C.
Figure 6B:
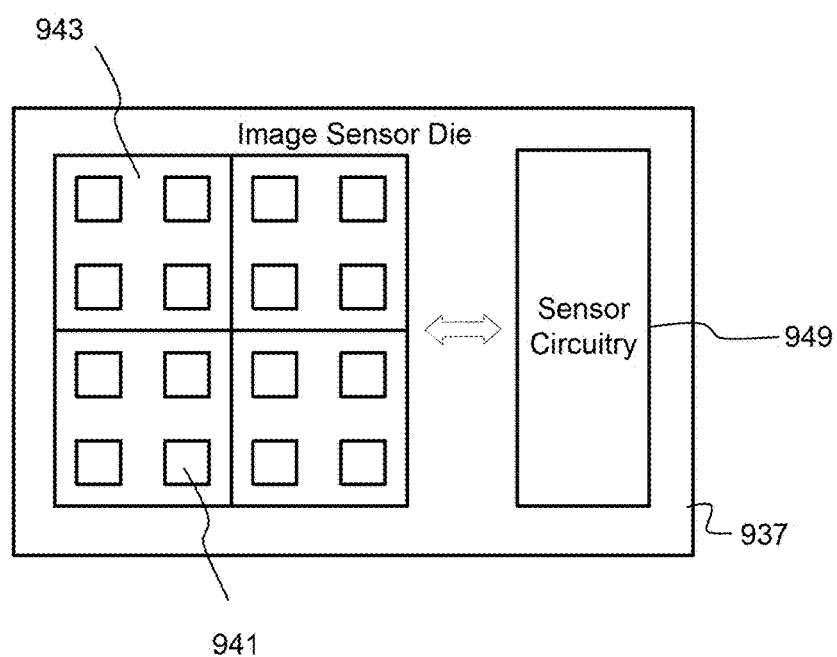

FIGS. 6A-6B are schematic diagrams depicting exemplary hybrid sensors in accordance with FIG. 3C. In FIG. 6A, a combined optical and capacitive sensor layer 931 is provided below a conditioning layer 420 and cover glass 401. FIG. 6B depicts the capacitive sensor layer 931 of FIG. 6A enlarged and in plan view. The combined optical and capacitive sensor layer 931 includes an image sensor die 937 having both photodiodes 941 (optical sensing elements) and capacitive sensor electrodes 943 (capacitive sensing elements) formed in and/or around an active region of the semiconductor die. Sensor circuitry 949 is provided in the same image sensor die substrate as the optical and capacitive sensing elements, and the sensor circuitry 949 is coupled to sensor elements using metal wiring formed in the image sensor die 937 (metal wiring not pictured). The sensor circuitry 949 includes an analog front end (AFE) and/or other circuits for operating the sensor elements, including an AFE for both the photodiodes 941 and capacitive sensor electrodes 943.

In the example shown in FIG. 6B, both the capacitive sensor electrodes and photodiodes are arranged in rectangular arrays, with the capacitive sensor electrodes having ¼ the resolution of the optical sensing elements. In other implementations, regular or irregular arrays are possible for either or both of the optical and capacitive sensing elements. Precise alignment between the capacitive sensor electrodes and photodiodes is possible using IC processing for both photodiodes and capacitive sensor electrodes in this example. The photodiodes 941 are formed in active semiconductor layers of the image sensor die 937, while the capacitive sensor electrodes may be formed in the top metal layer of the image sensor die 937.

As shown in FIG. 6B, it will be appreciated that pixels of an optical image sensor (e.g., corresponding to photodiodes 941 on image sensor die 937) may be arranged in a pattern on an image sensor die where there is space between each pixel. Capacitive sensing elements, such as capacitive sensor electrodes or pads, may thus be arranged in or above the spaces between and/or around the pixels of the optical image sensor to prevent the capacitive sensing elements from interfering with respective optical paths corresponding to each pixel (regardless of whether the capacitive sensing elements are part of a combined optical and capacitive sensor layer 331 as depicted in FIG. 3C, a combined conditioning and capacitive sensor layer 321 as depicted in FIG. 3B, or a separate capacitive sensor layer 310 as depicted in FIG. 3A). This is advantageous as it allows for non-transparent capacitive sensing elements to be used in the hybrid sensor without interfering with the optical sensing elements (in some embodiments, as discussed above, opaque capacitive sensing elements may further provide light conditioning functionality by blocking light from outside the respective optical paths corresponding to each pixel from reaching the optical image sensor).

Figure 7A:
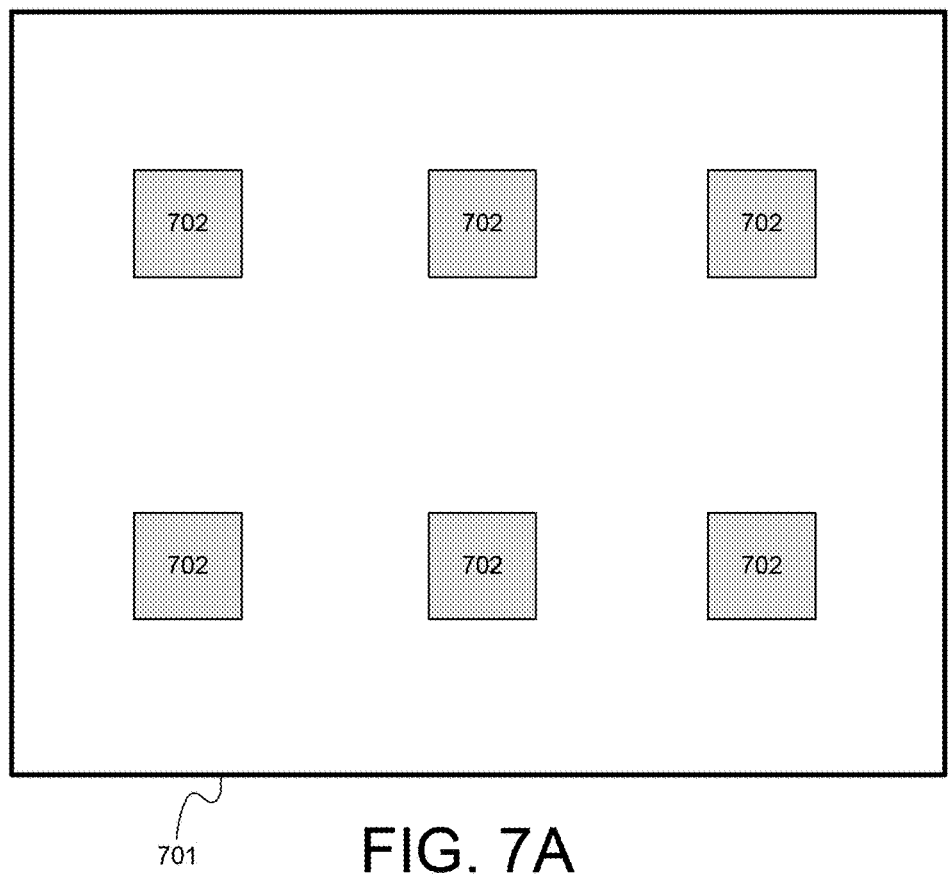
FIGS. 7A-7C are schematic diagrams depicting an excerpt of an exemplary arrangement of pixels on an image sensor layer.
Figure 7B:
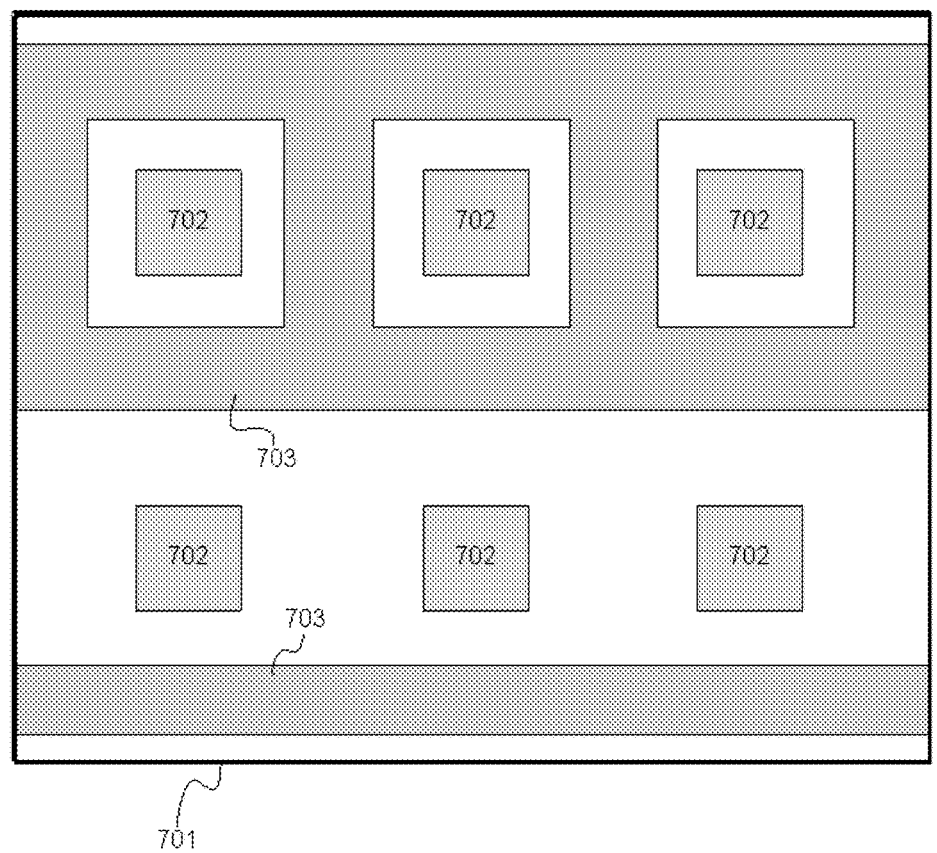
Figure 7C:
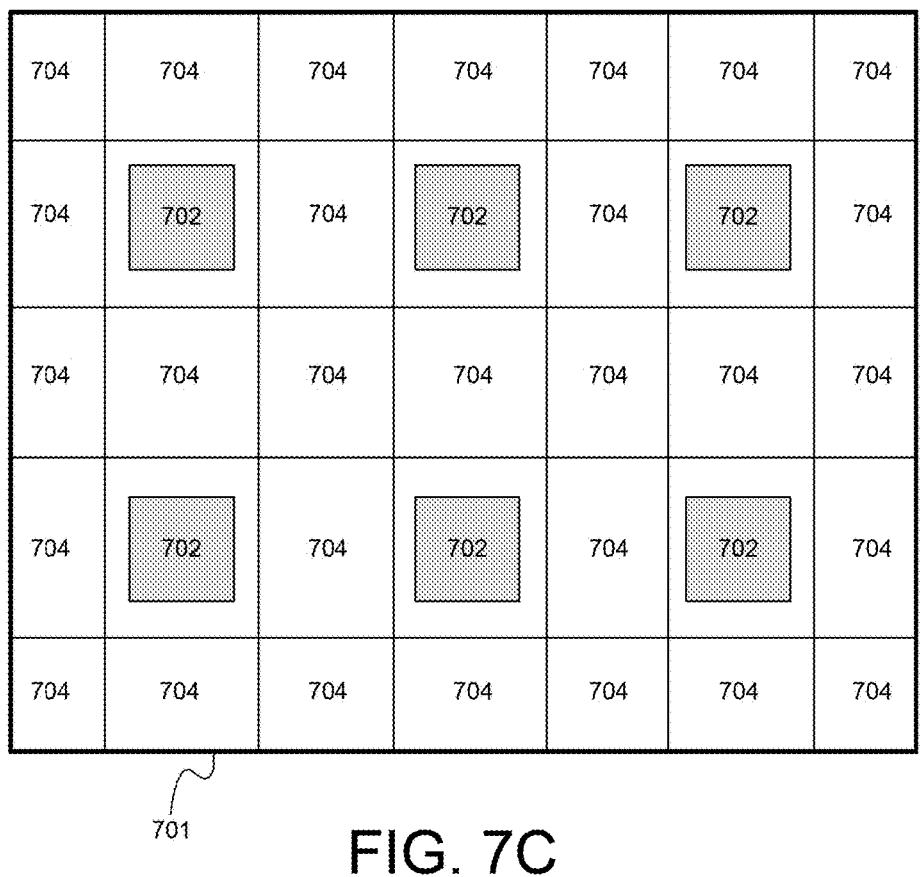

FIGS. 7A-7C are schematic diagrams depicting an excerpt of an exemplary arrangement of pixels on an image sensor layer 701. For simplicity, only a small number of pixels 702 are depicted in the excerpt. Routing of capacitive sensing elements may take place in and above the areas between the pixels 702. FIG. 7A is a top plan view of these six pixels 702 showing the areas around them in the image sensor layer 701.

FIG. 7B is another top plan view of six pixels 702 illustrating an exemplary arrangement of capacitive sensor electrodes 703 around the pixels 702. The capacitive sensor electrodes 703 are interleaved among the plurality of image sensor pixels 702 but are disposed outside of respective optical paths corresponding to the plurality of image sensor pixels 702. These capacitive sensor electrodes 703 may be transcapacitive sensor electrodes or absolute capacitance sensor electrodes, and may be disposed in or above the image sensor layer 701 (e.g., part of a combined optical and capacitive sensor layer 331 as depicted in FIG. 3C, a combined conditioning and capacitive sensor layer 321 as depicted in FIG. 3B, or a separate capacitive sensor layer 310 as depicted in FIG. 3A).

FIG. 7C is another top plan view of six pixels 702 illustrating another exemplary arrangement of capacitive sensor electrodes 704 disposed between and around the image sensor pixels 702. The capacitive sensor electrodes 704 are interleaved among the plurality of image sensor pixels 702 but are disposed outside of respective optical paths corresponding to the plurality of image sensor pixels 702. The capacitive sensor electrodes 704 may be disposed in the same layer as the optical sensor components (e.g., on an image sensor die) as depicted in FIG. 3C, or may be disposed on another layer such as the combined conditioning and capacitive sensor layer 321 depicted in FIG. 3B or the separate capacitive sensor layer 310 depicted in FIG. 3A.

In certain exemplary embodiments, the optical fingerprint sensor of the hybrid sensor is a CMOS image sensor that utilizes, for example, a resolution of 500 to 1000 dots per inch (DPI). This leaves significant space between the image sensor pixels that may be utilized for capacitive sensor elements.

Figure 8:
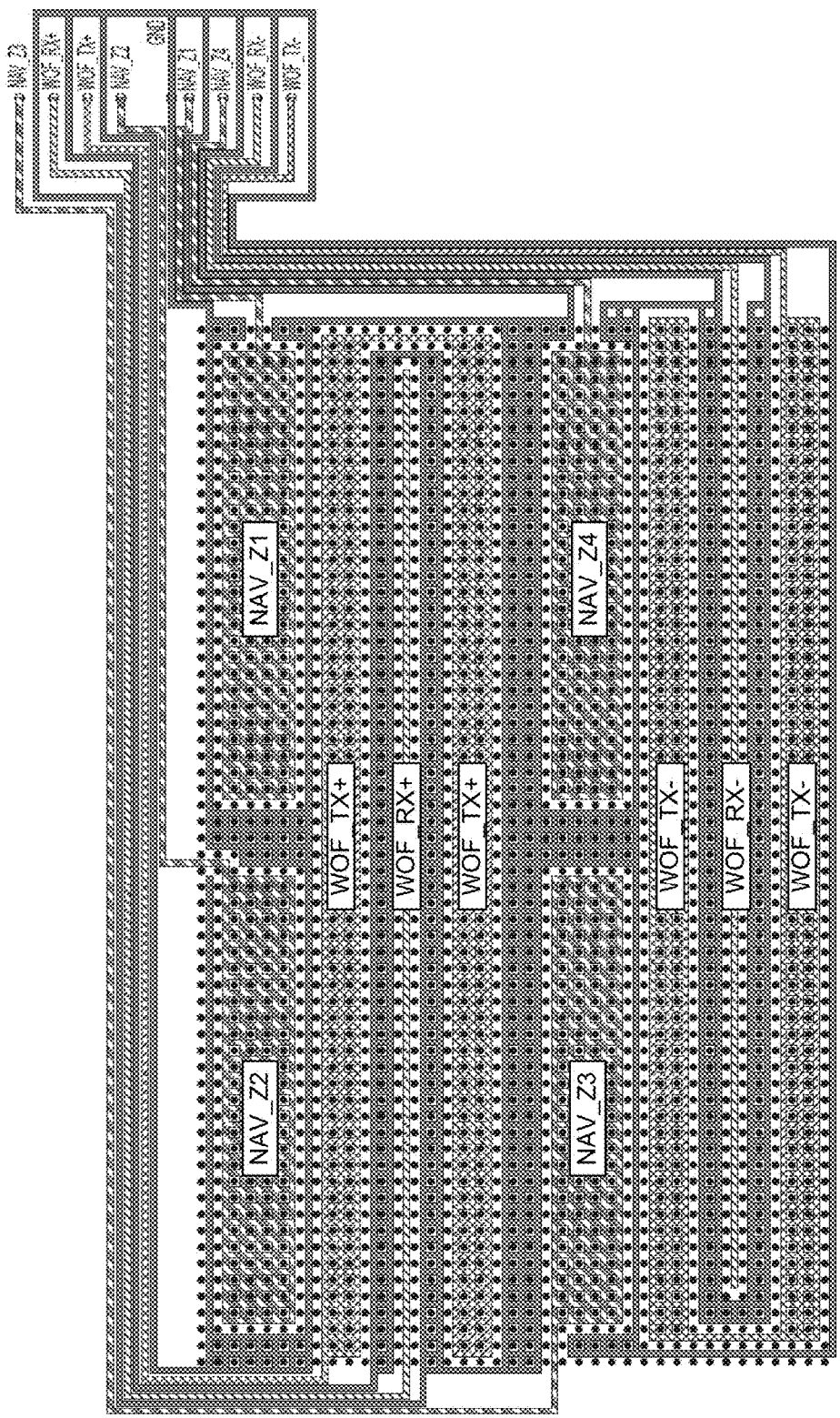
FIG. 8 is a schematic diagram depicting an exemplary arrangement of capacitive and optical sensing elements for a hybrid sensor.

FIG. 8 is a schematic diagram depicting an exemplary arrangement of capacitive and optical sensing elements for a hybrid sensor. In particular, FIG. 8 depicts a top plan view of a portion of the hybrid sensor showing exemplary capacitive sensor electrodes interleaved among exemplary image sensor pixels. In accordance with FIGS. 3B-3C, the arrangement of capacitive sensor electrodes shown in FIG. 8 may be integrated within a combined conditioning and capacitive sensor layer 321 or a combined optical and capacitive sensor layer 331. Alternatively, in accordance with FIG. 3A, the arrangement of capacitive sensor electrodes shown in FIG. 8 may be applied to a separate substrate such as a polyimide film (e.g., Kapton), with the separate substrate being substantially transparent to the desired wavelengths of light to be detected by the optical image sensor.

In certain exemplary embodiments, different capacitive sensor electrodes, may be dedicated to different respective functions. In the example depicted in FIG. 8, the eight depicted capacitive sensor electrodes include four NAV traces and four WOF traces. A ground trace for providing shielding is also depicted. The WOF traces interface with a respective WOF processing circuit while the NAV traces interface with a respective NAV processing circuit.

Because there are multiple distinct sets of capacitive sensor electrodes configured for different capacitive sensing functions, it is advantageous to interleave the traces in a manner such that when a finger partially touches the sensor, the finger is still likely to touch all of the distinct sets of capacitive sensor electrodes. For example, as depicted in FIG. 8, the arrangement of the capacitive sensor electrodes includes NAV traces (NAV_Z1 and NAV_Z2) at the top, followed by WOF traces (WOF_TX+ and WOF_RX+) in the middle, followed by another set of NAV traces (NAV_Z3 and NAV_Z4) in the middle, and another set of WOF traces (WOF_TX− and WOF_RX−) at the bottom.

The WOF traces are fully differential and transcapacitive, which provides for resistance to external noise sources (such as finger-coupled noise) and environmental changes (such as temperature changes). Additionally, because sensitive falls off very quickly with distance with respect to transcapacitive traces, the WOF traces have a very long design to increase the sensing surface and thereby increase the signal level. In contrast to the WOF traces, which span the length of the package, the NAV traces are arranged in an array of shorter electrodes spread across the sensing surface. This is because the NAV traces are configured to operate in situations where a finger only covers part of the sensing region, so as to be able to resolve motion of the finger based on changes in position. It is also advantageous to use absolute capacitance traces for the NAV traces to provide for more efficient routing of the electrodes. It will be appreciated however, that because the NAV traces are relatively small, the NAV processing system corresponding to the NAV traces receives relatively weaker signals and thus may be more sophisticated and consume more power than the WOF processing system corresponding to the WOF traces.

With respect to the differential WOF traces in FIG. 8, WOF_TX− corresponds to WOF_RX− and WOF_TX+ corresponds to WOF_RX+, with WOF_TX− and WOF_TX+ being activated alternately and providing relatively inverted driving signals that are received by WOF_RX− and WOF_RX+, respectively. Additionally, the placement of the differential WOF traces in FIG. 8, which includes WOF_TX+ and WOF_RX+ being disposed somewhat towards the center of the sensing region, makes it likely that a finger touching the sensing region is likely to be detected by at least one pair of WOF traces. With respect to the absolute capacitance NAV traces in FIG. 8, NAV_Z1, NAV_Z2, NAV_Z3 and NAV_Z4 each correspond to a portion of the sensing region, whereby a change of coverage from one or more portions of the sensing region corresponding to one or more the NAV traces to one or more other portions of the sensing regions corresponding to one or more other NAV traces may indicate movement of a finger on the sensing region.

It will be appreciated that the configuration of capacitive sensor electrodes shown in FIG. 8 is merely exemplary, and that other layouts may be used in other exemplary embodiments. For example, instead of having separate NAV and WOF traces, some or all traces may be used for both NAV and WOF operations. Additionally, the number of capacitive sensing elements used, as well as their arrangement, may vary for different applications. For example, for WOF operations, as few as one or two electrodes may be used to determine whether a finger is present or not. In another example, for navigation, a relatively higher number of electrodes would generally be used to discern movements of a finger (but it will be appreciated that the resolution used for navigation may be far lower than the resolutions used for capacitive fingerprint imaging). In different implementations of navigation, depending on the type of motion that is to be resolved and/or the type of information desired, differing amounts of electrodes may be used (e.g., to discern general direction without velocity details such as with swipe to unlock operations, relatively few electrodes are used, while relatively more electrodes would be used if precise position, direction, and/or velocity information is desired). In yet another example, for exemplary embodiments where the capacitive sensing elements are used to determine what portion of the sensing region is covered by a fingerprint, capacitive electrodes may be distributed around the sensing region and, depending on the feedback from those capacitive electrodes, the coverage of the sensing region by a fingerprint is determined.

Figure 9:
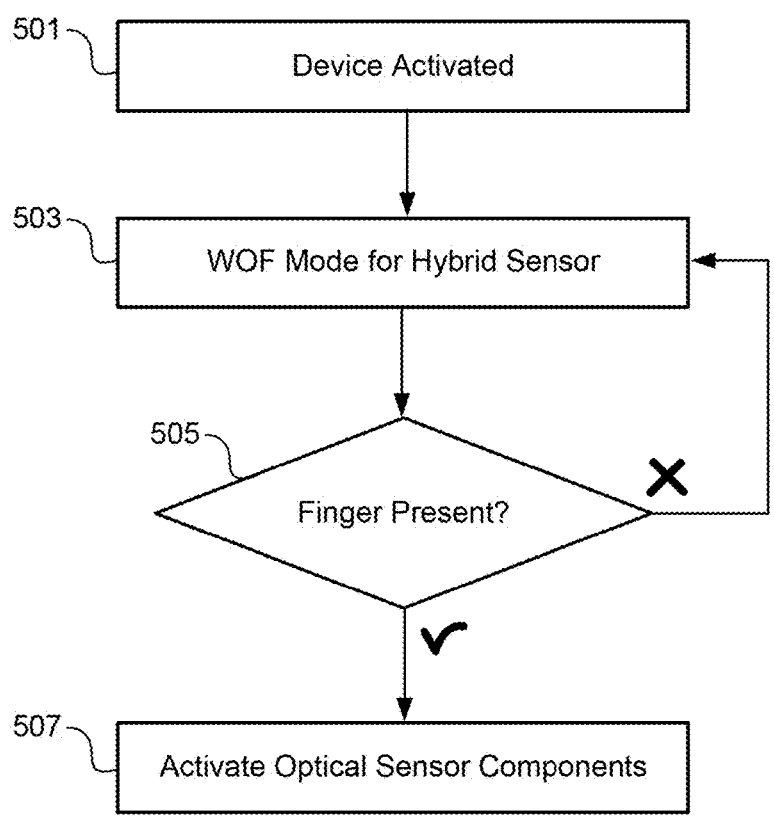
FIG. 9 is a flowchart depicting an exemplary wake-on-finger process.

FIG. 9 is a flowchart depicting an exemplary wake on finger process according to an exemplary embodiment. At stage 501, a device, such as a mobile phone, having a hybrid capacitive and optical sensor as discussed above, is activated (e.g., the device is powered on or woken up from an idle state). At stage 503, the hybrid sensor enters a WOF mode in which the capacitive sensor components of the hybrid sensor are activated in a low-power mode that is configured to detect the presence of a finger proximate to or on top of a fingerprint sensing region of the device. During the WOF mode, the optical sensor components of the hybrid sensor are inactive, so as to conserve power. If a finger is not detected as being present at stage 505, the hybrid sensor remains in the WOF mode. If a finger is detected as being present at stage 505 (e.g., based on a change in capacitance detected by the capacitive sensor components of the hybrid sensor), the optical sensor components of the hybrid sensor are activated at stage 507 to perform fingerprint imaging (e.g., the hybrid sensor may be operated in a fingerprint sensing mode during which an image of a fingerprint is obtained). The fingerprint imaging may be used, for example, for authentication and/or unlocking of a mobile device. Further, after the authentication and/or unlocking, the capacitive sensor components of the hybrid sensor may be operated in a NAV mode to provide NAV functions.

For many devices, such as mobile phones, a fingerprint sensor may be used to unlock the device from a locked state so as to provide an authorized user with access to the device's functionality. In devices with capacitive fingerprint sensors, the capacitive fingerprint sensor can be placed in a low-power mode that looks only for the presence of a finger, and, after a finger is detected as being present, the capacitive fingerprint sensor switches to a higher power mode for performing fingerprint imaging. In devices with optical fingerprint sensors, however, it may not be possible or it may be difficult to switch the optical image sensing chip into a "low power mode," and even in the "low power mode," the optical image sensor may still consume a relatively high amount of power relative to a capacitive sensor in a low-power mode (e.g., an optical sensor may include an active finger illumination light source or utilize light from a display, which would consume a relatively high amount of power relative to a capacitive sensor). Further, detecting the presence of a finger may be difficult in a low resolution, low power mode of an optical fingerprint sensor due to variations in ambient lighting and moving shadows near the optical fingerprint sensor.

Thus, exemplary embodiments provide a WOF mode in which the optical sensor components (and the associated active finger illumination light source) of a hybrid capacitive and optical sensor remain off, while a much lower power capacitive touch sensor continuously looks for the presence of a finger. Once the capacitive touch sensor detects the presence of a finger, the optical fingerprint sensor may be woken up and instructed to begin acquiring fingerprint images.

In certain exemplary embodiments, a touch sensor controller (e.g., comprising a chip and/or a processor and/or other appropriate circuit components) of the hybrid sensor communicates with an optical fingerprint sensor controller (e.g., comprising a chip and/or a processor and/or other appropriate circuit components) of the hybrid sensor to instruct the optical fingerprint sensor components to be activated. In other exemplary embodiments, a common controller (e.g., comprising a chip and/or a processor and/or other appropriate circuit components) of the hybrid sensor controls both the capacitive touch sensor components and the optical fingerprint sensor components. Additionally, the one or more controllers of the hybrid sensor may communicate with a controller (e.g., comprising a chip and/or a processor and/or other appropriate circuit components) of a host device (e.g., a device in which the hybrid sensor is integrated or a device connected to the hybrid sensor). In yet another implementation, a controller of the host device may control both the capacitive and optical sensor elements of the hybrid sensor, as well as other components of the host device. Additionally, it will be appreciated that WOF, NAV, anti-spoof processing with respect to the capacitive sensor components of the hybrid sensor may be provided by a touch sensor controller, a hybrid sensor controller, and/or a host device controller.

In certain exemplary embodiments, a controller (which may be any of the controllers mentioned above) is configured to operate the capacitive sensor electrodes to provide a wake-on-finger mode for the hybrid capacitive and optical fingerprint sensor, wherein the wake-on-finger mode includes: detecting whether a fingerprint is present in a sensing region of the hybrid capacitive and optical fingerprint sensor; and in response to detecting that a fingerprint is present in the sensing region, switching to a fingerprint sensing mode and causing the optical image sensor to be activated.

Figure 10:
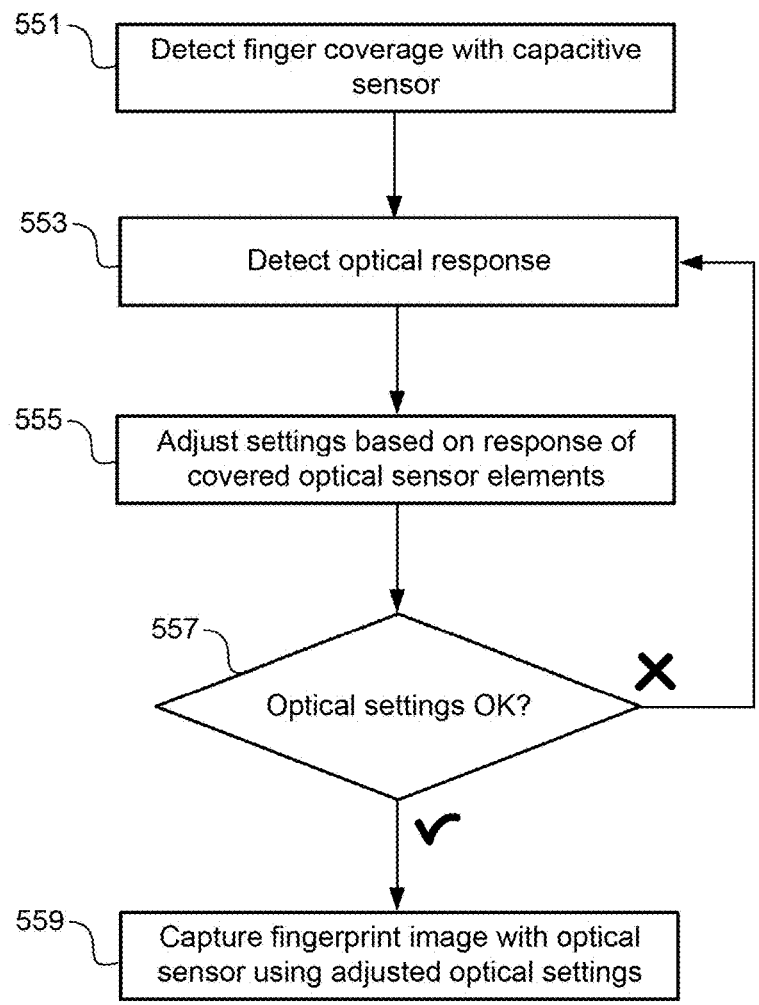
FIG. 10 is a flowchart depicting an exemplary process for adjusting settings for optical sensor components based on information from capacitive sensor components.

FIG. 10 is a flowchart depicting an exemplary process for adjusting settings for optical sensor components based on information from capacitive sensor components, which may include dynamic exposure/gain control based on capacitive sensor information of the hybrid fingerprint sensor. Exemplary embodiments of the hybrid sensor may use the capacitive sensor to provide feedback for imaging algorithms used by the optical image sensor (e.g., CMOS image algorithms). In one example, feedback from the capacitive sensor is used to provide dynamic exposure control/gain control to adjust the brightness and/or image quality, allowing a fingerprint image of optimal quality to be achieved. For example, if a fingerprint only partially covers a sensing region of the optical image sensor of the hybrid sensor, areas covered by the fingerprint may have a significantly different response than areas with no finger (e.g., the image may be much brighter where a finger is touching the sensing region due to the finger reflecting the light from the light source under relatively dark ambient light conditions, or the image may be much brighter where a finger is not touching the sensing region under relatively bright ambient light conditions). Thus, if the fingerprint only lands on part of the sensing region, then the covered portion of the sensing region can be set to an appropriate exposure level for sensing the features of the fingerprint (while effectively disregarding the uncovered portion of the sensing region). Without such dynamic exposure control/gain control, both the uncovered and covered portions of the sensing region may be incomprehensible, since one portion may have too much light while the other portion has too little light, resulting in insufficient contrast between features of the fingerprint (e.g., insufficient contrast between ridges and valleys).

At stage 551, finger coverage is detected using the capacitive sensor elements. At stage 553, an optical response is detected from optical sensor elements. At stage 555, settings for the optical sensor elements are adjusted based on the optical response corresponding to the covered optical sensor elements. This may involve adjusting gain control settings and/or adjusting exposure settings by operating the image sensor in an automatic gain control (AGC) and/or automatic exposure control (AEC) mode responsive to the covered pixels. Since it may take several iterations to adjust the settings properly, at stage 557 it is determined whether the optical settings are sufficient for image capture of the covered region. If they are not sufficient, the process returns to stage 553 and repeats. If they are sufficient, at stage 559, a fingerprint image, e.g., for authentication, is captured using the updated optical settings.

In certain exemplary embodiments, the detection of finger coverage of the sensing region of the optical sensor may be a one-time step performed at the outset of the process illustrated in FIG. 10. In other exemplary embodiments, the capacitive sensor elements may continuously monitor the sensing region such that, during one or more iterations of the tuning of the optical sensing elements at stages 553 through 557, if a change in the finger coverage of the sensing region is detected by the capacitive sensor elements (e.g., due to the finger moving), the tuning of the optical sensing elements starts over at stage 553. This prevents the hybrid sensor from misinterpreting a change in the quality of an optical response detected at stage 553 caused by movement of the finger as a change caused by adjusting the optical settings.

In certain exemplary embodiments, the capacitive touch sensor electrodes may be made of transparent ITO (or other similar conducting organic materials or metal oxides) or nearly transparent metal mesh structures, which allows them to be placed above the optical fingerprint sensor without interfering with the operation of the optical fingerprint sensor or impacting the performance of the optical fingerprint sensor. In one exemplary embodiment, the capacitive touch sensor electrodes may be built directly on the underside of the cover glass. In another exemplary embodiment, the capacitive touch sensor electrodes may be provided on a separate film or other transparent substrate and positioned between the cover glass and the optical fingerprint sensor.

In certain exemplary embodiments, for example as depicted in FIGS. 4A-4B, the capacitive touch sensor components being used during the WOF mode of the hybrid sensor may be relatively small (e.g., covering just the fingerprint sensing area).

In certain exemplary embodiments, other touch sensor types, such as resistive, pressure-sensitive or thermal touch sensors may be used in place of capacitive touch sensor components.

In certain exemplary embodiments, mobile devices having capacitive touch buttons (e.g., Home, Back, Menu, Settings, etc.) have a fingerprint sensor disposed beneath one or more of the capacitive touch buttons. In this case, the fingerprint sensor wake-up may be triggered by receiving a signal from the capacitive touch sensors corresponding to the respective one or more capacitive touch buttons. Further, these capacitive touch buttons may include illuminated button patterns (such as a house, arrow or some other icon), and the optical fingerprint sensor may be disposed underneath a transparent OLED device that is used to illuminate the respective one or more capacitive touch buttons disposed above the optical fingerprint sensor. In this case, the OLED device may be used to illuminate the icon(s) when the fingerprint sensor is not in use, and the transparent or substantially transparent OLED device is turned off when the underlying optical fingerprint sensor is used to perform fingerprint imaging (and thus does not interfere with the underlying optical fingerprint sensor's ability to image fingerprints).

In certain exemplary embodiments, the hybrid sensor described herein may be used to provide improved security and/or anti-spoof functionality with respect to fingerprint sensing. Because a capacitive sensor is being used in combination with an optical image sensor with respect to the hybrid sensor, the input to the hybrid sensor would need to be electrically conductive in order to be detected by the capacitive sensor. Thus, in addition to providing fingerprint matching via the optical image sensor, the capacitive sensor of the hybrid sensor is able to check whether a real biometric input is actually present (as opposed to an image of the biometric input or a plastic mold of the biometric input) based on the capacitive properties of the input.

In certain exemplary embodiments, the hybrid sensor described herein includes a capacitive sensor and optical image sensor that are both able to perform fingerprint imaging. For example, by extracting multimode (capacitive/optical) ridge/valley information, a processing system for the hybrid sensor may determine whether the capacitively and optically obtained images are correlated in order to determine whether an input biometric input matches a registered biometric input.

In certain exemplary embodiments, the hybrid sensor may use the capacitive sensor to determine a resolution at which to operate the optical image sensor based on the amount of the sensing region covered by an input. For example, if there is complete coverage of a sensing region with a biometric input such as a fingerprint, the optical image sensor may be operated at a lower resolution (e.g., 500 dpi because there is sufficient coverage of the sensing region such that an image of the fingerprint captured at 500 dpi may be sufficient to perform a fingerprint matching operation using relatively large features such as ridge endings, ridge bifurcations, etc.). In another example, if there is incomplete coverage of a sensing region with the biometric input (e.g., if the fingerprint only covers half the sensing region), there may not be enough of these relatively large features to perform matching, so the optical image sensor may be operated at a higher resolution (e.g., 1000 dpi) to obtain relatively smaller features (e.g., micro-features and/or minutiae such as pores) to facilitate the fingerprint matching operation. Thus, in this example, while the image size may be halved due to the fingerprint covering only half the sensing region, the resolution is doubled, such that the overall bandwidth is not affected. It will be appreciated that the registration of the biometric input should be performed at the relatively higher resolution (e.g., 1000 dpi) to enable this feature.

Without the feedback from the capacitive sensor indicating which portion of the sensing region is covered by the finger, the processing system for the optical image sensor may not know how to adjust the exposure/gain such that the desired portion of the sensing region is resolvable. However, by using the capacitive sensor of the hybrid sensor to obtain capacitive data which can be used to determine which portions of the sensing region are covered, the processing system for the hybrid sensor can make proper adjustments for the obtained with-finger portion such that features of the finger may be resolved (while discarding the obtained no-finger portion and/or applying the same parameters to the no-finger portion).

In certain exemplary embodiments, by utilizing capacitive sensing combined with optical sensing, feedback to the user may be provided via light or haptic cues to guide the user with respect to the location of the sensing region.

In certain exemplary embodiments, the capacitive sensor of the hybrid sensing may be configured to detect hover and/or settling of a biometric input above the sensing region, so as to initiate waking up the optical image sensor in advance of the biometric input being placed onto the sensing region. This may allow for faster processing time (e.g., faster authentication) to be experienced by the user while still achieving the power savings associated with only waking up the optical image sensor when needed.

It will be appreciated that although the examples discussed herein demonstrate the exemplary implementations with respect to fingerprint sensors, these techniques may also be used in other embodiments for other types of sensors having different resolutions beyond just sensors configured to detect fingerprint patterns.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having, " "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A hybrid capacitive and optical fingerprint sensor, comprising:
   capacitive sensor electrodes;
   an optical image sensor having a plurality of image sensor pixels;
   light conditioning elements, configured to condition light from a sensing region of the hybrid capacitive and optical fingerprint sensor for detection by the optical image sensor; and
   a processing system having one or more controllers, configured to operate the capacitive sensor electrodes in a low-power mode of operation for the hybrid capacitive and optical fingerprint sensor, and to operate the optical image sensor to acquire an image from the sensing region of the hybrid capacitive and optical fingerprint sensor;
   wherein the low-power mode of operation for the hybrid capacitive and optical fingerprint sensor includes operation of the capacitive sensor electrodes to determine coverage of the sensing region by a fingerprint, and adjusting a resolution at which the optical image sensor is operated based on the coverage of the sensing region by the fingerprint.

2. The hybrid capacitive and optical fingerprint sensor according to claim 1, wherein the capacitive sensor electrodes are disposed in a capacitive sensor layer of the hybrid capacitive and optical fingerprint sensor, the optical image sensor is disposed in an optical sensor layer of the hybrid capacitive and optical fingerprint sensor, and the light conditioning elements are disposed in a conditioning layer of the hybrid capacitive and optical fingerprint sensor;
   wherein the conditioning layer is disposed below the capacitive sensor layer and the optical sensor layer is disposed below the conditioning layer.

3. The hybrid capacitive and optical fingerprint sensor according to claim 1, wherein the capacitive sensor electrodes and the light conditioning elements are disposed in a combined conditioning and capacitive sensor layer of the hybrid capacitive and optical fingerprint sensor, and the optical image sensor is disposed in an optical sensor layer of the hybrid capacitive and optical fingerprint sensor;
   wherein the optical sensor layer is disposed below the combined conditioning and capacitive sensor layer.

4. The hybrid capacitive and optical fingerprint sensor according to claim 1, wherein the capacitive sensor electrodes and the optical image sensor are disposed in a combined optical and capacitive sensor layer of the hybrid capacitive and optical fingerprint sensor, and the light conditioning elements are disposed in a conditioning layer of the hybrid capacitive and optical fingerprint sensor;
   wherein the combined optical and capacitive sensor layer is disposed below the conditioning layer.

5. The hybrid capacitive and optical fingerprint sensor according to claim 1, wherein the low-power mode of operation for the hybrid capacitive and optical fingerprint sensor includes operation of the capacitive sensor electrodes in a wake-on-finger mode, wherein the wake-on-finger mode includes using the capacitive sensor electrodes to detect whether a fingerprint is present in or proximate to the sensing region and, in response to detecting the presence of the fingerprint, activating a fingerprint sensing mode in which the optical image sensor is used to acquire an image from the sensing region of the hybrid capacitive and optical fingerprint sensor.

6. The hybrid capacitive and optical fingerprint sensor according to claim 1, wherein the low-power mode of operation for the hybrid capacitive and optical fingerprint sensor includes operation of the capacitive sensor electrodes in a navigation mode, wherein the navigation mode includes using the capacitive sensor electrodes to detect presence, position, and/or movement of the fingerprint.

7. The hybrid capacitive and optical fingerprint sensor according to claim 1, wherein the low-power mode of operation for the hybrid capacitive and optical fingerprint sensor includes detecting a response from the plurality of image sensor pixels, and adjusting settings for the optical image sensor based on a portion of the response corresponding to the coverage of the sensing region by the fingerprint.

8. The hybrid capacitive and optical fingerprint sensor according to claim 7, wherein adjusting the settings for the optical image sensor includes adjusting exposure or gain settings for the optical image sensor.

9. The hybrid capacitive and optical fingerprint sensor according to claim 1, wherein the low-power mode of operation for the hybrid capacitive and optical fingerprint sensor includes operation of the capacitive sensor electrodes to determine capacitive properties of an input on the sensing region, and based on the capacitive properties of the input, determining whether the input is a real biometric input.

10. The hybrid capacitive and optical fingerprint sensor according to claim 1, wherein the capacitive sensor electrodes are interleaved among the plurality of image sensor pixels but are disposed outside of respective optical paths corresponding to the plurality of image sensor pixels.

11. The hybrid capacitive and optical fingerprint sensor according to claim 1, wherein the capacitive sensor electrodes comprise a first set of electrodes corresponding to a wake-on-finger mode of the hybrid capacitive and optical fingerprint sensor and a second set of electrodes, separate from the first set of electrodes, corresponding to a navigation mode of the hybrid capacitive and optical fingerprint sensor.

12. A hybrid capacitive and optical fingerprint sensor, comprising:
 capacitive sensor electrodes;
 an optical image sensor having a plurality of image sensor pixels; and
 light conditioning elements, configured to condition light from a sensing region of the hybrid capacitive and optical fingerprint sensor for detection by the optical image sensor;
 wherein the capacitive sensor electrodes and the optical image sensor are disposed in a combined optical and capacitive sensor layer of the hybrid capacitive and optical fingerprint sensor, and the light conditioning elements are disposed in a conditioning layer of the hybrid capacitive and optical fingerprint sensor.

13. The hybrid capacitive and optical fingerprint sensor according to claim 12, wherein the capacitive sensor electrodes are interleaved among the plurality of image sensor pixels but are disposed outside of respective optical paths corresponding to the plurality of image sensor pixels.

14. A processing system for a hybrid capacitive and optical fingerprint sensor having capacitive sensor electrodes, light conditioning elements, and an optical image sensor, the processing system comprising one or more controllers configured to execute processor-executable instructions to control the capacitive sensor electrodes and the optical image sensor, wherein execution of the processor-executable instructions facilitates:
 operating the capacitive sensor electrodes in a low-power mode of operation for the hybrid capacitive and optical fingerprint sensor; and
 operating the optical image sensor to acquire an image from a sensing region of the hybrid capacitive and optical fingerprint sensor;
 wherein the low-power mode of operation for the hybrid capacitive and optical fingerprint sensor includes: operating the capacitive sensor electrodes to determine coverage of the sensing region by a fingerprint, and adjusting a resolution at which the optical image sensor is operated base on the coverage of the sensing region by the fingerprint.

15. The processing system according to claim 14, wherein the low-power mode of operation for the hybrid capacitive and optical fingerprint sensor includes:
 operating the capacitive sensor electrodes in a wake-on-finger mode, wherein the wake-on-finger mode includes using the capacitive sensor electrodes to detect whether a fingerprint is present in or proximate to the sensing region and, in response to detecting the presence of the fingerprint, activating a fingerprint sensing mode in which the optical image sensor is used to acquire an image from the sensing region of the hybrid capacitive and optical fingerprint sensor.

16. The processing system according to claim 14, wherein the low-power mode of operation for the hybrid capacitive and optical fingerprint sensor includes:
 operating the capacitive sensor electrodes in a navigation mode, wherein the navigation mode includes using the capacitive sensor electrodes to detect presence, position, and/or movement of a fingerprint on the sensing region.

17. The processing system according to claim 14, wherein the low-power mode of operation for the hybrid capacitive and optical fingerprint sensor includes:
 detecting a response from a plurality of image sensor pixels of the optical image sensor, and adjusting settings for the optical image sensor based on a portion of the response corresponding to the coverage of the sensing region by the fingerprint.

18. The processing system according to claim 17, wherein adjusting the settings for the optical image sensor includes adjusting exposure or gain settings for the optical image sensor.

19. The processing system according to claim 14, wherein the low-power mode of operation for the hybrid capacitive and optical fingerprint sensor includes:
 operating the capacitive sensor electrodes to determine capacitive properties of an input on the sensing region, and based on the capacitive properties of the input, determining whether the input is a real biometric input.

20. A hybrid capacitive and optical fingerprint sensor, comprising:
 capacitive sensor electrodes;
 an optical image sensor having a plurality of image sensor pixels;
 light conditioning elements, configured to condition light from a sensing region of the hybrid capacitive and optical fingerprint sensor for detection by the optical image sensor; and
 a processing system having one or more controllers, configured to operate the capacitive sensor electrodes in a low-power mode of operation for the hybrid capacitive and optical fingerprint sensor, and to operate the optical image sensor to acquire an image from the sensing region of the hybrid capacitive and optical fingerprint sensor;
 wherein the capacitive sensor electrodes and the optical image sensor are disposed in a combined optical and capacitive sensor layer of the hybrid capacitive and optical fingerprint sensor, and the light conditioning elements are disposed in a conditioning layer of the hybrid capacitive and optical fingerprint sensor;

wherein the combined optical and capacitive sensor layer is disposed below the conditioning layer.

21. The hybrid capacitive and optical fingerprint sensor according to claim 20, wherein the low-power mode of operation for the hybrid capacitive and optical fingerprint sensor includes operation of the capacitive sensor electrodes in a wake-on-finger mode, wherein the wake-on-finger mode includes using the capacitive sensor electrodes to detect whether a fingerprint is present in or proximate to the sensing region and, in response to detecting the presence of the fingerprint, activating a fingerprint sensing mode in which the optical image sensor is used to acquire an image from the sensing region of the hybrid capacitive and optical fingerprint sensor.

22. The hybrid capacitive and optical fingerprint sensor according to claim 20, wherein the low-power mode of operation for the hybrid capacitive and optical fingerprint sensor includes operation of the capacitive sensor electrodes in a navigation mode, wherein the navigation mode includes using the capacitive sensor electrodes to detect presence, position, and/or movement of a fingerprint.

23. The hybrid capacitive and optical fingerprint sensor according to claim 20, wherein the low-power mode of operation for the hybrid capacitive and optical fingerprint sensor includes detecting a response from the plurality of image sensor pixels, and adjusting settings for the optical image sensor based on a portion of the response corresponding to coverage of the sensing region by a fingerprint.

24. The hybrid capacitive and optical fingerprint sensor according to claim 23, wherein adjusting the settings for the optical image sensor includes adjusting exposure or gain settings for the optical image sensor.

25. The hybrid capacitive and optical fingerprint sensor according to claim 20, wherein the low-power mode of operation for the hybrid capacitive and optical fingerprint sensor includes operation of the capacitive sensor electrodes to determine capacitive properties of an input on the sensing region, and based on the capacitive properties of the input, determining whether the input is a real biometric input.

26. The hybrid capacitive and optical fingerprint sensor according to claim 20, wherein the capacitive sensor electrodes are interleaved among the plurality of image sensor pixels but are disposed outside of respective optical paths corresponding to the plurality of image sensor pixels.

27. The hybrid capacitive and optical fingerprint sensor according to claim 20, wherein the capacitive sensor electrodes comprise a first set of electrodes corresponding to a wake-on-finger mode of the hybrid capacitive and optical fingerprint sensor and a second set of electrodes, separate from the first set of electrodes, corresponding to a navigation mode of the hybrid capacitive and optical fingerprint sensor.

28. A hybrid capacitive and optical fingerprint sensor, comprising:

capacitive sensor electrodes;

an optical image sensor having a plurality of image sensor pixels;

light conditioning elements, configured to condition light from a sensing region of the hybrid capacitive and optical fingerprint sensor for detection by the optical image sensor; and a processing system having one or more controllers, configured to operate the capacitive sensor electrodes in a low-power mode of operation for the hybrid capacitive and optical fingerprint sensor, and to operate the optical image sensor to acquire an image from the sensing region of the hybrid capacitive and optical fingerprint sensor;

wherein the low-power mode of operation for the hybrid capacitive and optical fingerprint sensor includes operation of the capacitive sensor electrodes to determine coverage of the sensing region by a fingerprint, detecting a response from the plurality of image sensor pixels, and adjusting settings for the optical image sensor based on a portion of the response corresponding to the coverage of the sensing region by the fingerprint.

29. The hybrid capacitive and optical fingerprint sensor according to claim 28, wherein adjusting the settings for the optical image sensor includes adjusting exposure or gain settings for the optical image sensor.

30. A hybrid capacitive and optical fingerprint sensor, comprising:

capacitive sensor electrodes;

an optical image sensor having a plurality of image sensor pixels;

light conditioning elements, configured to condition light from a sensing region of the hybrid capacitive and optical fingerprint sensor for detection by the optical image sensor; and a processing system having one or more controllers, configured to operate the capacitive sensor electrodes in a low-power mode of operation for the hybrid capacitive and optical fingerprint sensor, and to operate the optical image sensor to acquire an image from the sensing region of the hybrid capacitive and optical fingerprint sensor;

wherein the capacitive sensor electrodes comprise a first set of electrodes corresponding to a wake-on-finger mode of the hybrid capacitive and optical fingerprint sensor and a second set of electrodes, separate from the first set of electrodes, corresponding to a navigation mode of the hybrid capacitive and optical fingerprint sensor.

31. A processing system for a hybrid capacitive and optical fingerprint sensor having capacitive sensor electrodes, light conditioning elements, and an optical image sensor having a plurality of image sensor pixels, the processing system comprising one or more controllers configured to execute processor-executable instructions to control the capacitive sensor electrodes and the optical image sensor, wherein execution of the processor-executable instructions facilitates:

operating the capacitive sensor electrodes in a low-power mode of operation for the hybrid capacitive and optical fingerprint sensor; and operating the optical image sensor to acquire an image from a sensing region of the hybrid capacitive and optical fingerprint sensor;

wherein the low-power mode of operation for the hybrid capacitive and optical fingerprint sensor includes: operating the capacitive sensor electrodes to determine coverage of the sensing region by a fingerprint, detecting a response from the plurality of image sensor pixels, and adjusting settings for the optical image sensor based on a portion of the response corresponding to the coverage of the sensing region by the fingerprint.

32. The processing system according to claim 31, wherein adjusting the settings for the optical image sensor includes adjusting exposure or gain settings for the optical image sensor.

* * * * *